United States Patent
Dykes et al.

(10) Patent No.: US 11,383,584 B2
(45) Date of Patent: Jul. 12, 2022

(54) DEVICE AND METHOD FOR CONTROLLING OPERATION OF TRANSPORT REFRIGERATION UNIT

(71) Applicant: THERMO KING CORPORATION, Minneapolis, MN (US)

(72) Inventors: David J. Dykes, Eagan, MN (US); Ross T. Nelson, Minneapolis, MN (US); James E. Conde, Plymouth, MN (US)

(73) Assignee: Thermo King Corporation, Minneapolis, MN (US)

(*) Notice: Subject to any disclaimer, the term of this patent is extended or adjusted under 35 U.S.C. 154(b) by 108 days.

(21) Appl. No.: 16/884,388

(22) Filed: May 27, 2020

(65) Prior Publication Data

US 2020/0282794 A1 Sep. 10, 2020

Related U.S. Application Data

(63) Continuation of application No. 15/363,524, filed on Nov. 29, 2016, now Pat. No. 10,703,174.

(Continued)

(51) Int. Cl.
*B60H 1/32* (2006.01)
*F25B 49/02* (2006.01)
*B60H 1/00* (2006.01)

(52) U.S. Cl.
CPC ....... *B60H 1/3232* (2013.01); *B60H 1/00014* (2013.01); *B60H 1/3208* (2013.01);
(Continued)

(58) Field of Classification Search
CPC ............. B60H 1/3232; B60H 1/00014; B60H 1/3208; B60H 1/3222; B60H 2001/3272;
(Continued)

(56) References Cited

U.S. PATENT DOCUMENTS

| | | |
|---|---|---|
| 4,325,224 A | 4/1982 | Howland |
| 4,697,430 A | 10/1987 | Toyoda et al. |

(Continued)

FOREIGN PATENT DOCUMENTS

| | | |
|---|---|---|
| DE | 102006044999 | 4/2007 |
| EP | 1099918 | 5/2001 |

(Continued)

OTHER PUBLICATIONS

European Search Repod, issued in corresponding European Application No. 16201454.2, dated Mar. 9, 2017 (8 pages).

(Continued)

*Primary Examiner* — Nelson J Nieves
(74) *Attorney, Agent, or Firm* — Hamre, Schumann, Mueller & Larson, P.C.

(57) ABSTRACT

A transport refrigeration unit and a method for controlling the transport refrigeration unit, wherein the transport refrigeration unit has a controller device for operating a compressor of the transport refrigeration unit with a continuously-variable speed, which allows the compressor to run continuously but with a smooth gradient range of speed variations. The controller device allows the transport refrigeration unit to have a start-stop operation stage, continuous run operation stage, and/or a cycle-sentry operation stage.

18 Claims, 3 Drawing Sheets

Related U.S. Application Data

(60) Provisional application No. 62/261,012, filed on Nov. 30, 2015.

(52) U.S. Cl.
CPC ......... *B60H 1/3222* (2013.01); *F25B 49/022* (2013.01); *B60H 2001/3272* (2013.01); *B60H 2001/3273* (2013.01); *F25B 2500/19* (2013.01); *F25B 2600/0251* (2013.01); *F25B 2600/0253* (2013.01); *F25B 2600/25* (2013.01); *F25B 2700/2104* (2013.01); *F25B 2700/2106* (2013.01); *Y02B 30/70* (2013.01)

(58) Field of Classification Search
CPC ........... B60H 2001/3273; F25B 49/022; Y02B 30/70
See application file for complete search history.

(56) References Cited

U.S. PATENT DOCUMENTS

| | | | |
|---|---|---|---|
| 4,878,360 A | 11/1989 | Viegas | |
| 5,046,326 A | 9/1991 | Havemann et al. | |
| 5,052,189 A | 10/1991 | Akiike | |
| 5,121,610 A | 6/1992 | Atkinson et al. | |
| 5,275,012 A | 1/1994 | Dage et al. | |
| 5,586,438 A * | 12/1996 | Fahy | A01N 1/02 435/284.1 |
| 5,669,226 A * | 9/1997 | Kurahashi | B60H 1/3205 62/227 |
| 6,725,680 B1 | 4/2004 | Schenk et al. | |
| 7,080,521 B2 | 7/2006 | Ludwig et al. | |
| 8,863,540 B2 | 10/2014 | Alston et al. | |
| 10,215,436 B1 | 2/2019 | Rawski | |
| 2008/0083834 A1* | 4/2008 | Krebs | F24F 11/30 237/2 A |
| 2009/0001866 A1 | 1/2009 | Kaga et al. | |
| 2009/0105884 A1 | 4/2009 | Kaga et al. | |
| 2010/0082160 A1 | 4/2010 | Kondou et al. | |
| 2010/0106302 A1 | 4/2010 | Thogersen et al. | |
| 2010/0218519 A1* | 9/2010 | Hall | F25B 41/31 62/73 |
| 2010/0243231 A1* | 9/2010 | Rosen | G05D 23/1904 165/237 |
| 2011/0072836 A1* | 3/2011 | Wang | F25D 11/04 62/79 |
| 2011/0138826 A1 | 6/2011 | Lifson et al. | |
| 2012/0000210 A1 | 1/2012 | Kim et al. | |
| 2012/0010753 A1 | 1/2012 | Schuster et al. | |
| 2012/0101673 A1 | 4/2012 | Caddick et al. | |
| 2012/0303165 A1 | 11/2012 | Qu et al. | |
| 2013/0061618 A1 | 3/2013 | Wait | |
| 2013/0248165 A1 | 9/2013 | Kandasamy | |
| 2015/0122472 A1 | 5/2015 | Higuchi et al. | |
| 2015/0184912 A1 | 7/2015 | Nelson et al. | |
| 2015/0192343 A1 | 7/2015 | Ueno et al. | |
| 2015/0300713 A1 | 10/2015 | Sun et al. | |
| 2015/0330691 A1 | 11/2015 | McSweeney | |
| 2015/0338135 A1 | 11/2015 | Satou et al. | |
| 2015/0352925 A1 | 12/2015 | Olyleye et al. | |
| 2016/0272049 A1 | 9/2016 | Renken et al. | |
| 2016/0311288 A1 | 10/2016 | Mayo Mayo et al. | |
| 2016/0313039 A1* | 10/2016 | Popli | F25B 49/022 |
| 2017/0028813 A1 | 2/2017 | Enomoto et al. | |
| 2017/0203632 A1 | 7/2017 | Westendarp et al. | |
| 2018/0112894 A1* | 4/2018 | Gurz | F25B 13/00 |

FOREIGN PATENT DOCUMENTS

| | | |
|---|---|---|
| JP | 404151447 | 5/1992 |
| WO | 2006132638 | 12/2006 |
| WO | 2015189009 | 12/2015 |

OTHER PUBLICATIONS

European Search Repod, issued in corresponding European Application No. 16201454.2, dated Mar. 22, 2018 (6 pages).

* cited by examiner

DEVICE AND METHOD FOR CONTROLLING OPERATION OF TRANSPORT REFRIGERATION UNIT

FIELD

The embodiments disclosed herein relate generally to devices and methods directed to controlling an operation of a transport refrigeration unit ("TRU").

BACKGROUND

Transport refrigeration systems ("TRS"s) are used to cool a container (typically referred to as a refrigerated transport unit or "TU"). The TU can be used to transport perishable items such as produce and meat products. In such a case, the TRS can be used to condition the air inside a cargo space of the TU, thereby maintaining desired temperature and humidity during transportation or storage. Different perishable items can require different desired temperatures during transport. A TRU is attached to the TU to facilitate a heat exchange between the air inside the cargo space and the air outside of the TU. Some TRUs have a compressor which is directly coupled to an engine (e.g., the engine of a vehicle connected to the TU). The engine coupled to the compressor transfers power to the compressor to provide cooling or heating capacity to the TU (e.g., to the volume of space inside the TU). Generally, the engine provides the compressor with two operation modes: (1) a low speed operation mode, and (2) a high speed operation mode. The low speed operation mode is used to control the temperature when the TU has reached a setpoint temperature (e.g., desired temperature) and thus requires low refrigeration system capacity. The high speed operation mode is used during pull-down or pull-up situations when the TU is far away from the setpoint temperature, and thus higher refrigeration system capacity is necessary to change the temperature of the TU to the setpoint temperature. The engine uses more fuel when the compressor is operating in the high speed operation mode than operating in the low speed operation mode. Generally, when the TRS is in operation, the TU can switch between the two discrete speed operation modes (i.e., the low speed operation mode and the high speed operation mode) several times based on the setpoint temperature and the temperature of the TU because the temperature of the TU can change due to the ambient temperature changes and other factors.

SUMMARY

Generally, because the TRU is coupled to the engine, the lowest possible engine speed is considered to provide the best fuel consumption. It has been found that using only the lowest possible engine speed is not necessarily "optimal" because running the engine at the lowest possible engine speed can require a very long time for the temperature inside the TU to reach the setpoint or desired temperature (e.g., temperature required for a particular cargo) in the TU. Accordingly, operating the engine at the lowest engine speed can result in a high amount engine operation hours (e.g., engine duty cycle) for a given amount of temperature control hours. High engine duty cycle can result in poor resale value of the TRU (e.g., much like a car having a high mileage reading on the odometer).

Further, there are situations when it is desirable to bring the temperature inside the TU to a desired or setpoint temperature quickly (sometimes, even as soon as possible, for example, to prevent spoilage of cargo stored in the TU). In such situations, the engine can be operated at the highest possible engine speed to bring the temperature inside the TRU to the setpoint, but such operation can result in very poor fuel consumption.

Accordingly, it has been found that the engine which provides the compressor with only two operation modes (a low speed operation mode, and a high speed operation mode) cannot optimize fuel consumption in real world transport refrigeration applications.

According to an embodiment, the TRU includes a controller device. The controller device refers to an electronic device, which includes a processor component and a non-transitory computer-readable medium (e.g., memory, computer-readable storage, etc.). The controller device commands, directs and/or regulates the operation of a compressor of the TRU. An embodiment of the controller device of the TRU operates the compressor of the TRU to have a continuously-variable speed mode which allows the compressor to run continuously but with a smooth gradient range of speed variations. Thus, the compressor can be operated in continuously have varying speeds instead of the discrete two speeds (i.e., the low speed operational mode, and the high speed operational mode). Thus, the TRU can have several operating stages, such as, for example, start-stop operation stage, continuous run operation stage, and/or a cycle-sentry operation stage.

According to an embodiment, the compressor does not have only the two operating modes (low speed and high speed). That is, the compressor, according to an embodiment, can be operated at variable speeds of more than two speeds.

The compressor, according to an embodiment, can be operated at continuously variable speeds (e.g., not discrete speeds).

Further, the compressor, according to an embodiment, can be operated at a range of speeds that is greater than the range of speed of the engine to which the compressor is coupled to.

The engine directly coupled to the compressor, according to an embodiment, can be operated at continuously variable speeds (e.g., not discrete speeds).

Further, according to an embodiment, the engine that is directly coupled to the compressor does not drive the compressor to have only the two operating modes (low speed and high speed). That is, the engine drives the compressor so that the compressor operates at variable speeds of more than two speeds.

DETAILED DESCRIPTION

The fuel efficiency of the TU when the TRS is in operation can be improved by controlling the TU to operate according to the embodiments disclosed herein.

Figure 1:
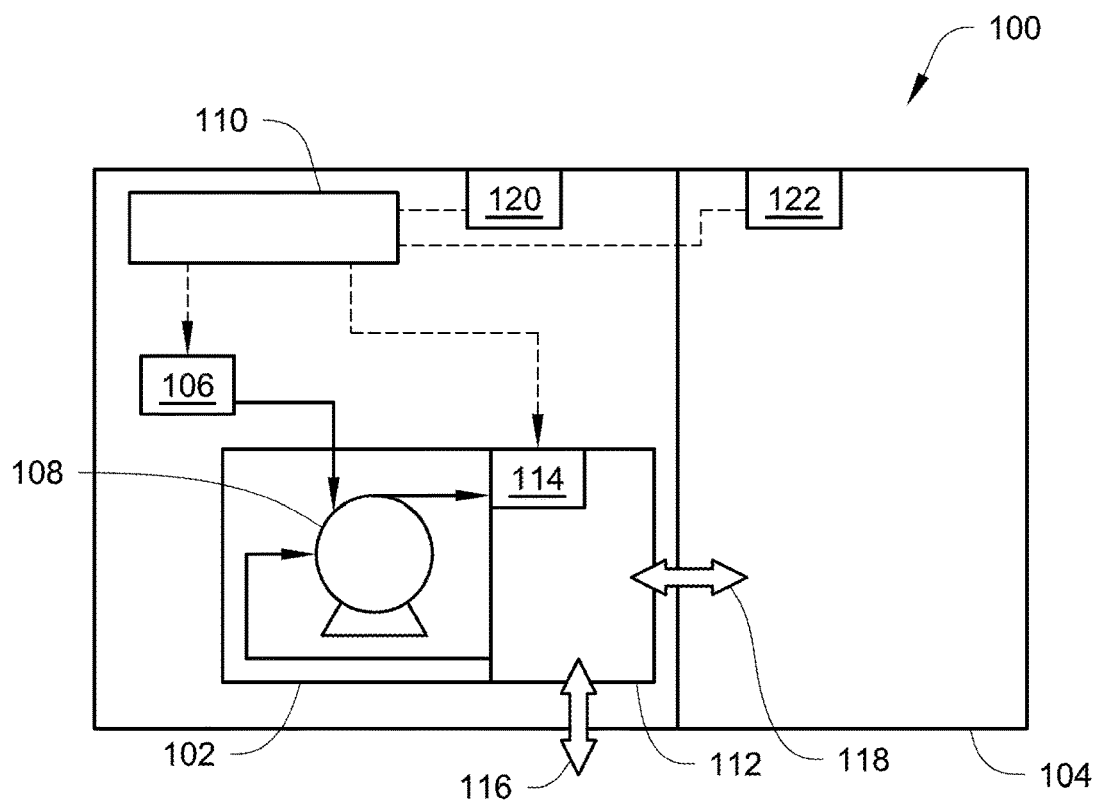
FIG. 1 shows a schematic drawing of an embodiment of a transport refrigeration system including a TRU and a TU.

FIG. 1 shows an embodiment of a TRS 100. The TRS 100 includes a TRU 102, and a TU 104 (e.g., a container) to which the TRU 102 is connected to for controlling the environment inside the TU 104.

An engine 106 is connected to the TRU 102 for powering the TRU 102, and a controller device 110 is in communication with the engine 106 and the TRU 102 for operating the TRU 102. The TRU 102 includes a compressor 108 which is directly coupled to the engine 106. The compressor 108 is a part of the refrigerant fluid circuit 112 of the TRU 102, wherein the refrigerant fluid circuit 112 includes a condenser and an evaporator through which a refrigerant fluid flows. The flow of the refrigerant fluid through the refrigerant fluid circuit 112 is provided by, at least, the compressor 108. The refrigerant fluid circuit 112 includes a capacity limiting device 114, which can be for example, an electronic throttling valve (ETV).

The controller device 110 is in communication with the engine 106 for controlling the operation of the engine 106. Because the engine 106 is coupled to the compressor 108, the controller device 110 can control the operation of the compressor 108 by controlling the engine 106.

The TRU 102 directs the flow of heat between the outside of the TU 104 and the inside of the TU 104 (e.g., flow of heat shown as arrows 116, 118 in FIG. 1). That is, the refrigerant fluid circuit 112 of the TRU 102 can direct the flow of heat 116, 118 from the outside of the TU 104 to the inside of the TU 104, or from the inside of the TU 104 to the outside of the TU 104.

The controller device 110 is in communication with the capacity limiting device 114 (e.g., ETV) and controls the opening and/or closing of the capacity limiting device 114. In certain situations, as described below in regards to FIG. 4, the controller device 110 opens the capacity limiting device 114, as much as 100% (which means completely open). In certain situations, as described below in regards to FIG. 4, the controller device 110 opens the capacity limiting device 114, as little as 0% (which means the capacity limiting device 114 is completely closed). Accordingly, the controller device 110 can be configured to control the capacity limiting device 114 to be open in the range of 0% (completely closed) to 100% (completely open).

The controller device 110 is in communication with one or more sensor devices 120, 122 and receives data from the sensor devices 120, 122. Based on the data received, the controller device 110 controls the operation of the engine 106 and thus the compressor 108 for affecting the environment conditions inside the TU 104. For example, one of the sensor devices 120 can detect and/or measure the ambient temperature outside of the TU 104. Another one of the sensor devices 122 can detect and/or measure the temperature inside the TU 104. Accordingly, the controller device 110 can control the operation of the engine 106, which drives the compressor 108, based on the received data from the sensor devices 120, 122, wherein the received data include the ambient temperature outside of the TU 104 ("Tamb") and the temperature inside the TU 104 ("Tbox").

The controller device 110 controls the operation of the engine 106 (thus, the compressor 108 of the TRU 102) so that the compressor 108 has a continuously-variable speed mode which allows the compressor 108 to run continuously but with a smooth gradient range of speed variations. Thus, the compressor 108 operates in continuously varying speeds, and can provide continuously varying temperature control rates to the TU 104.

Figure 2:
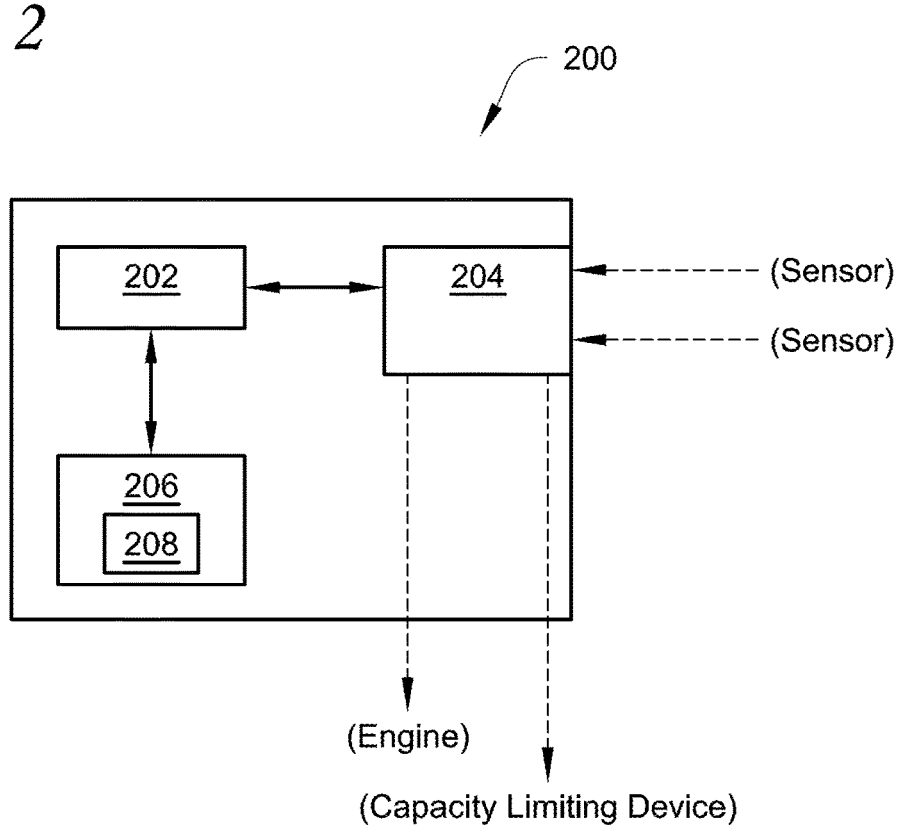
FIG. 2 shows a schematic drawing of an embodiment of a controller device which controls an operation of a TRU.

FIG. 2 shows an embodiment of the controller device 200 which is similar to the controller device 110 shown in FIG. 1. The controller device 200 includes, but is not necessarily limited by, a processor component 202 in communication with an interface component 204 for communicating with other components, such as for example, the engine (e.g., 106 shown in FIG. 1), the sensor devices (e.g., 120, 122 shown in FIG. 1), and the capacity limiting device (e.g., 114 shown in FIG. 1). Although not shown, the interface component 204 can also be in communication with the compressor (e.g., 108 shown in FIG. 1) so that the processor component 202 can send and/or receive data to and/or from the compressor (e.g., 108 shown in FIG. 1) via the interface component 204. The controller device 200 also includes a non-transitory computer-readable memory 206 that is in communication with the processor component 202. The non-transitory computer-readable memory 206 has stored therein computer-readable and computer-executable instructions 208 that can be executed by the processor component 202 to control the TRU (e.g., 102 shown in FIG. 1) according to one or more of the embodiments of the methods shown in FIGS. 3 and 4. Accordingly, the computer-readable and computer-executable instructions 208 can be instructions for carrying out one or more of the methods shown in FIGS. 3 and 4. Thus, the processor component 202 can execute the computer-readable and computer-executable instructions 208 for carrying out one or more of the methods shown in FIGS. 3 and 4.

Figure 3:
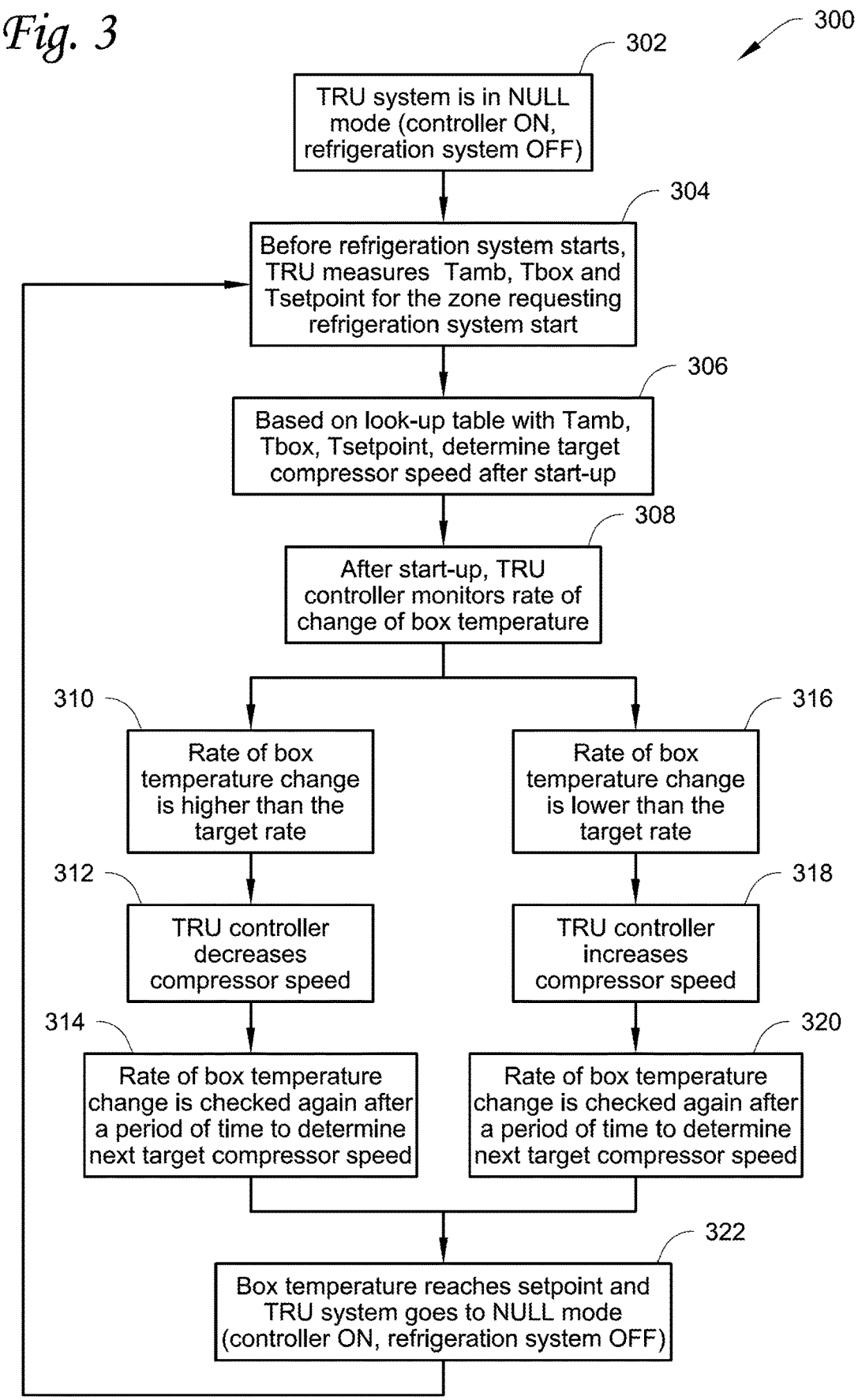
FIG. 3 shows a schematic flowchart for an embodiment of a method for controlling an operation of the compressor of the TRU according to computer-readable and computer-executable instructions stored in a non-transitory computer-readable memory which can be executed by a processor.

FIG. 3 shows a flowchart 300 for an embodiment of a method in computer-readable and computer-executable instructions (e.g., 208 shown in FIG. 2) stored in a non-transitory computer-readable memory (e.g., 206 shown in FIG. 2) which can be executed by a processor component (e.g., 202 shown in FIG. 2) for controlling an operation of the compressor (e.g., 108 shown in FIG. 1) of the TRU (e.g., 102 shown in FIG. 1). Accordingly, when computer-readable and computer-executable instructions are executed by the processor component (e.g., 202 shown in FIG. 2) of the TRU, the following method is performed by the controller device (e.g., 110 shown in FIG. 1, and 200 shown in FIG. 2) for controlling the operation of the compressor (e.g., 108 shown in FIG. 1) of the TRU. The process shown in FIG. 3 includes examples of a start-stop operation stage of the TRU and a cycle-sentry operation stage of the TRU.

In step 302, the TRU is set to a "NULL" mode, wherein the controller device is on and operational, but the refrigeration system is off (e.g., the compressor is not operating to control the temperature in the TU). Thus, at this stage, the TRU is at a "stop" of the start-stop operation stage of the TRU.

In step 304, which is prior to the refrigeration system is turned on for controlling the temperature in the TU, the controller device receives or collects temperature data from one or more of the sensor devices (e.g., 120, 122 shown in FIG. 1) that the TRU is in communication with. For example, as shown in FIG. 1 and described above, the controller device receives ambient temperature data (Tamb) and the temperature inside the TU (Tbox) from the respective sensor devices. The controller device also receives an input of the temperature setpoint ("Tsetpoint"), which is the desired temperature inside the TU. The Tsetpoint is stored in the non-transitory computer-readable memory.

In step 306, the processor component of the controller device determines the target compressor speed to be reached based on the Tamb, Tbox, and Tsetpoint information stored in the non-transitory computer-readable memory. For example, the controller device's computer-readable memory has stored therein a look-up table or database which has a correlation of the compressor speed based on the three variables, Tamb, Tbox, and Tsetpoint. The processor component operates with information which associates the target compressor speed to an expected rate of change to Tbox with respect to time based on Tamb. Thus, the controller device can determine the target compressor speed and/or expected rate of change to Tbox with respect to time based on the look-up table or database. As another example, the processor component of the controller device can determine the target compressor speed on the fly based on the three variables, Tamb, Tbox, and Tsetpoint. Accordingly, the processor component can also be configured to determine the expected rate of change to Tbox with respect to time. Then the refrigeration system is turned on and the controller device controls the engine speed in order to achieve the target compressor speed (and thus, the expected rate of change to Tbox with respect to time). The expected rate of change to Tbox with respect to time can be called the "target rate" and the TRU at this stage is at the "start" in the start-stop operation stage of the TRU.

Steps 308 to 320 shown in FIG. 3 is an example of a cycle-sentry operation of the TRU as performed by the controller device.

In step 308, the controller device receives, continuously or frequently, Tbox data from the sensor device (e.g., 122 shown in FIG. 1) and an actual rate of change to Tbox with respect to time is determined by the processor component of the controller device. The processor component of the controller device makes a determination of whether the actual rate of change to Tbox with respect to time is higher than the target rate determined in step 306, or whether the actual rate of change to Tbox with respect to time is lower than the target rate determined in step 306. From step 308, the controller device can proceed to either step 310 or step 316.

In step 310, when the controller device determines that the actual rate of change to Tbox with respect to time is higher than the target rate.

Then, in step 312, the controller device decreases the compressor speed (e.g., by controlling the engine to slow the speed of the engine) in order to reduce the magnitude of the actual rate of change to Tbox with respect to time.

In step 314, after the change to the compressor speed, the controller device receives Tbox data from the sensor device (e.g., 122 shown in FIG. 1) and another actual rate of change to Tbox with respect to time is determined by the processor component of the controller device. The controller device determines a new target rate based on some of the variables from the following: Tamb, Tbox, Tsetpoint, and the most recently determined actual rate of change to Tbox with respect to time. This new target rate is likely different from the target rate determined in step 306. For example, the magnitude of the new target rate can be less than the magnitude of the target rate determined in step 306. Then, based on the new target rate, the controller device determines a new target compressor speed and controls the operation of the compressor to achieve the new target compressor speed via controlling the speed of the engine. From step 314, the controller device proceeds to step 322.

Alternative to step 310, in step 316, the controller device determines that the actual rate of change to Tbox with respect to time is lower than the target rate.

Then, in step 318, the controller device increases the compressor speed (e.g., by controlling the engine to increase the speed of the engine) in order to increase the magnitude of the actual rate of change to Tbox with respect to time.

In step 320, after the change to the compressor speed, the controller device receives Tbox data from the sensor device (e.g., 122 shown in FIG. 1) and another actual rate of change to Tbox with respect to time is determined by the processor component of the controller device. The controller device determines a new target rate based on some of the variables from the following: Tamb, Tbox, Tsetpoint, and the most recently determined actual rate of change to Tbox with respect to time. This new target rate is likely different from the target rate determined in step 306. For example, the magnitude of the new target rate can be greater than the magnitude of the target rate determined in step 306. Then, based on the new target rate, the controller device determines a new target compressor speed and controls the operation of the compressor to achieve the new target compressor speed via controlling the speed of the engine. From step 320, the controller device proceeds to step 322.

Once the Tbox has reached the Tsetpoint, in step 322, the TRU is set to a "NULL" mode, wherein the controller device is on and operational, but the refrigeration system is off (e.g., the compressor is not operating to control the temperature in the TU, similar to in step 302). Then, the controller device proceeds to step 304 to continue the operation cycle. It is expected that the controller device according to this method can lead to about 15% to 20% improvement in the fuel efficiency for the engine coupled to the compressor of the TRU. And again, at this stage, the TRU is at a "stop" of the start-stop operation stage of the TRU.

Further, the method for controlling the TRU via variable speed can also provide a range for the speed of the compressor that is broader than the range for the speed of the engine. Accordingly, a range for refrigeration capacity (e.g., mass flow) can be made broader than the range of the compressor speed, thus also broader than the range for the speed of the engine.

In another embodiment, the continuously variable speed control of the compressor speed is replaced by a multi-stage (e.g., more than two speeds), quantized speed control.

Figure 4:
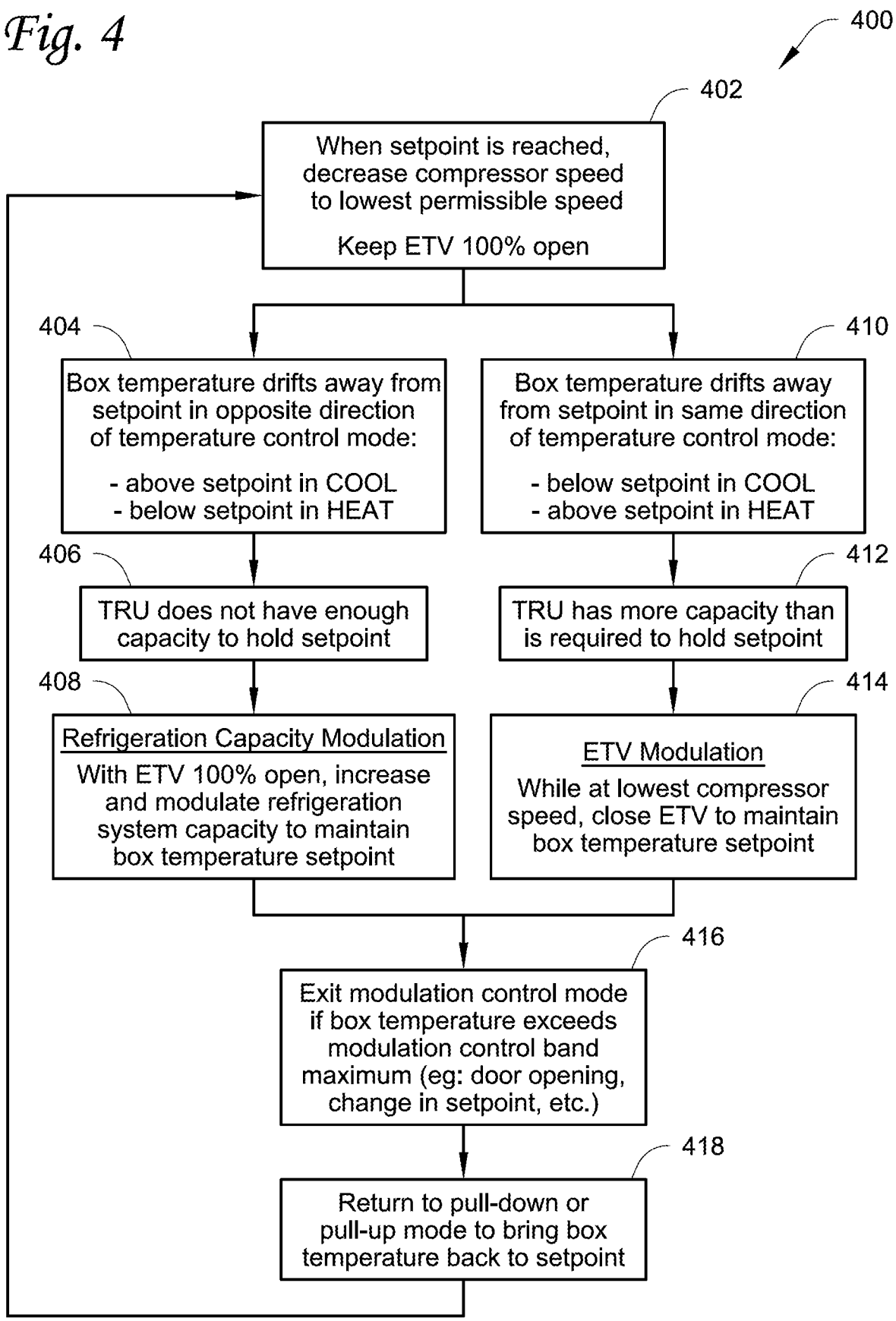
FIG. 4 shows a schematic flowchart for another embodiment of a method for controlling the operation of the compressor of the TRU according to computer-readable and computer-executable instructions stored in the non-transitory computer-readable memory which can be executed by the processor.

FIG. 4 shows a flowchart 400 for an embodiment of a method in computer-readable and computer-executable instructions (e.g., 208 shown in FIG. 2) stored in a non-transitory computer-readable memory (e.g., 206 shown in FIG. 2) which can be executed by a processor component (e.g., 202 shown in FIG. 2) for controlling an operation of the compressor (e.g., 108 shown in FIG. 1) of the TRU (e.g., 102 shown in FIG. 1). Accordingly, when the computer-readable and computer-executable instructions are executed by the processor component of the TRU, the following method is performed by the controller device (e.g., 110 shown in FIG. 1, and 200 shown in FIG. 2) for controlling the operation of the compressor (e.g, by controlling the operation of the engine 106 shown in FIG. 1). The process shown in FIG. 4 includes an example of a continuous operation stage of the TRU.

In step 402, the TRU is already on, and Tbox has reached the Tsetpoint. Thus, the step 402 likely follows the method shown in FIG. 3. The controller device controls the operation of the engine so that the compressor of the TRU runs at the lowest permissible speed. In an embodiment of the TRU, the controller device can control the continuously variable speed compressor to operate at an ultra-low speed operation mode, which leads to even greater fuel efficiency. This step can be in either COOL or HEAT mode, depending on whether the Tbox is above or below Tsetpoint, and whether Tamb is above or below Tsetpoint. Further, the TRU includes a capacity limiting device (e.g., an electronic throttling valve (ETV)) which is open 100% at this step. From step 402, either step 404 or step 410 is possible.

In step 404, the controller device detects that the Tbox is drifting away from Tsetpoint in the same direction of the temperature control mode of the TRU, for example, the Tbox drift direction is going below Tsetpoint when in COOL mode, or the Tbox drift direction is going above Tsetpoint when in HEAT mode. Then, in step 406, the controller device recognizes that the TRU has more capacity than required to hold Tbox at Tsetpoint. Then, in step 408, the compressor is still operating at the lowest permissible speed (preferably at the ultra-low speed operation mode), but the capacity limiting device (e.g., the ETV) closes to maintain Tbox at or near Tsetpoint. That is, the ETV can be closed to stop the Tbox drifting further away from the Tsetpoint.

In step 410, the controller device detects that the Tbox is drifting away from Tsetpoint in the opposite direction of the temperature control mode of the TRU, for example, the Tbox drift direction is going above Tsetpoint when in COOL mode, or the Tbox drift direction is going below Tsetpoint when in HEAT mode. Then, in step 412, the controller device recognizes that the TRU does not have enough capacity to hold Tbox at Tsetpoint. Then, in step 414, the controller device increases the engine speed to compensate for the temperature drift in order to bring Tbox back to Tsetpoint. The capacity limiting device (e.g., the ETV) is still open 100% at this stage.

Accordingly, the controller device operates to improve temperature control by providing only the TRU output capacity necessary to maintain Tbox at Tsetpoint. Fuel consumption can be improved because the TRU is not required to cycle between low and high engine speeds or cycle between COOL and HEAT modes to maintain Tbox at Tsetpoint.

From either steps 408 or 414, the method 400 proceeds to step 416 of exiting the modulation control (either ETV modulation of 408 or the engine modulation of 414) when the controller device determines that Tbox exceeds the modulation control band range (e.g., in situations such as when a door of the TU is opened, Tsetpoint has been changed, etc.). Then, the controller device changes operating mode from continuous operating mode in FIG. 4 to the start-stop operating mode in FIG. 3 to bring Tbox to Tsetpoint. Then, the process can switch to the continuous operating mode by proceeding to step 402.

Further, it is expected that the methods shown in FIGS. 3 and 4 can advantageously and surprisingly improve fuel efficiency by about 10% in the cycle-sentry operation stage (e.g., FIG. 3), and by about 15-20% in continuous run operation stage (e.g., see FIG. 4).

Aspects

Any of the elements in the following Aspects can be combined together.

Aspect 1. A controller device for controlling an operation of a transport refrigeration unit, wherein the controller device operates the compressor of the transport refrigeration unit to have a variable refrigeration capacity.

Aspect 2. The controller device according to Aspect 1, wherein the controller device operates the compressor of the transport refrigeration unit to have a variable speed mode which allows the compressor to run continuously with a gradient range of speed variations to have the variable refrigeration capacity.

Aspect 3. The controller device according to any one or more of Aspects 1-2, wherein the variable speed mode includes a continuously-variable speed mode, and the gradient range of speed variations includes a continuously-variable speed mode.

Aspect 4. The controller device according to any one or more of Aspects 1-3, wherein the compressor does not operate in discrete speeds.

Aspect 5. The controller device according to any one or more of Aspects 1-4, wherein compressor does not operate in discrete speeds consisting of a low speed and a high speed.

Aspect 6. The controller device according to any one or more of Aspects 1-5, wherein the transport refrigeration unit includes a start-stop operation stage.

Aspect 7. The controller device according to any one or more of Aspects 1-6, wherein the transport refrigeration unit further includes a cycle-sentry operation stage.

Aspect 8. The controller device according to any one or more of Aspects 1-7, wherein the transport refrigeration unit further includes a continuous run operation stage.

Aspect 9. The controller device according to any one or more of Aspects 1-8, wherein the transport refrigeration unit includes one or more of a start-stop operation stage, a cycle-sentry operation stage, and a continuous run operation stage.

Aspect 10. The controller device according to any one or more of Aspects 1-9, wherein the controller device receives temperature data from one or more sensor devices; and the controller device determines a target compressor speed to be reached based on the temperature data.

Aspect 11. The controller device according to any one or more of Aspects 1-10, wherein the controller device controls the compressor speed in order to achieve the target compressor speed.

Aspect 12. The controller device according to any one or more of Aspects 1-11, wherein the controller device determines an expected rate of change to a temperature inside a transport unit with respect to time; the controller device determines an actual rate of change to the temperature inside the transport unit with respect to time based on temperature data from one or more sensor devices; and the controller device performs a comparison of the expected rate of change to the actual rate of change and controls the compressor speed based on the comparison of the expected rate of change to the actual rate of change.

Aspect 13. The controller device according to any one or more of Aspects 1-12, wherein the controller device receives a temperature of an inside a transport unit; the controller device compares the temperature inside the transport unit to a preset setpoint temperature; and when the controller device determines that the temperature inside the transport unit is equal to the preset setpoint temperature, the controller device controls the compressor to operate a lowest speed in the continuously variable speed mode.

Aspect 14. The controller device according to any one or more of Aspects 1-13, wherein the controller device determines the temperature inside the transport unit drifting away from the preset setpoint temperature, and a direction of temperature drift; and the controller device controlling a capacity limiting device of the transport refrigeration unit for modulating refrigeration capacity of the transport unit.

Aspect 15. The controller device according to any one or more of Aspects 1-14, wherein the controller device determines the temperature inside the transport unit drifting away from the preset setpoint temperature, and a direction of temperature drift; and the controller device controlling the compressor speed for modulating refrigeration capacity of the transport unit.

Aspect 16. A method for electronically controlling a transport refrigeration unit, comprising:
   a controller device receiving temperature data from one or more sensor devices; and
   the controller device determining a target compressor speed to be reached based on the temperature data; and
   the controller device controlling a compressor to achieve the target compressor speed.

Aspect 17. The method according to Aspect 16, further comprising:
   the controller device determining an expected rate of change to a temperature inside a transport unit with respect to time;
   the controller device determining an actual rate of change to the temperature inside the transport unit with respect to time based on temperature data from one or more sensor devices;
   the controller device performing a comparison of the expected rate of change to the actual rate of change; and
   the controller device controlling the compressor speed based on the comparison of the expected rate of change to the actual rate of change.

Aspect 18. The method according to any one or more of Aspects 1-17, further comprising:
   the controller device receiving a temperature inside a transport unit;
   the controller device comparing the temperature inside the transport unit to a preset setpoint temperature;
   the controller device determining that the temperature inside the transport unit is equal to the preset setpoint temperature; and
   the controller device controlling the compressor to operate a lowest speed in the continuously variable speed mode.

Aspect 19. The method according to any one or more of Aspects 1-18, further comprising:
   the controller device determining that the temperature inside the transport unit is drifting away from the preset setpoint temperature, and a direction of temperature drift; and
   the controller device controlling a capacity limiting device of the transport refrigeration unit for modulating the variable refrigeration capacity of the transport unit.

Aspect 20. The method according to any one or more of Aspects 1-19, further comprising:
   the controller device determining the temperature inside the transport unit is drifting away from the preset setpoint temperature, and a direction of temperature drift; and
   the controller device controlling the compressor speed for modulating the variable refrigeration capacity of the transport unit.

Aspect 21. A transport refrigeration unit, comprising:
   a compressor connected to a refrigeration fluid circuit; and
   a controller device for controlling an operation of the compressor according to any one or more of Aspects 1-15.

Aspect 22. The transport refrigeration unit according to Aspect 21, wherein the controller device operates the compressor to have one or more of a start-stop operation stage, a cycle-sentry operation stage, and a continuous run operation stage.

Aspect 23. A transport refrigeration unit, comprising:
   a compressor connected to a refrigeration fluid circuit; and
   a controller device, wherein a method of operation performed by the controller device is according to any one or more of the methods in Aspects 16-20.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A method for electronically controlling a transport refrigeration system that provides climate control within a transport unit, the transport refrigeration system including a refrigerant fluid circuit that includes a valve and a compressor configured to compress refrigerant flowing through the refrigerant fluid circuit, the valve configured to control refrigerant flow through the refrigerant fluid circuit, the method comprising:
   a controller device receiving temperature data from a sensor device; and
   the controller determining that a temperature within the transport unit has reached a preset setpoint temperature based on the temperature data;
   upon determining that the temperature within the transport unit has reached the preset setpoint temperature, the controller determining that the temperature within the transport unit is drifting away from the preset setpoint temperature in a same direction as a temperature control mode;
   the controller reducing a compressor speed so as to operate at a lowest permissible compressor speed and instructing the valve to close while the compressor is operating at the lowest permissible compressor speed in order to stop the temperature inside the transport unit from drifting further away from the preset setpoint temperature.

2. The method according to claim 1, further comprising the controller operating the compressor to have a variable speed mode which allows the compressor to run continuously with a gradient range of speed variations to have a variable refrigeration capacity.

3. The method according to claim 2, wherein the variable speed mode includes a continuously-variable speed mode.

4. The method according to claim 1, further comprising the controller operating the compressor in one or more of a start-stop operation stage, a cycle-sentry operation stage, and a continuous run operation stage.

5. The method according to claim 1, further comprising:
   upon determining that the temperature within the transport unit has reached the preset setpoint temperature, the controller determining that the temperature within the transport unit is drifting away from the preset setpoint temperature in an opposite direction as the temperature control mode;
   the controller instructing the valve to open and increasing the compressor speed while the valve is open in order to stop the temperature within the transport unit from drifting further away from the preset setpoint temperature.

6. The method according to claim 1, further comprising prior to determining that the temperature within the transport unit has reached the preset setpoint temperature:
   the controller determining a target compressor speed to be reached based on the temperature data;
   the controller controlling the compressor to achieve the target compressor speed.

7. The method according to claim 1, further comprising:
the controller determining an expected rate of change to a temperature within the transport unit with respect to time;
the controller determining an actual rate of change to the temperature within the transport unit with respect to time based on temperature data;
the controller performing a comparison of the expected rate of change to the actual rate of change; and
the controller controlling the compressor speed based on the comparison of the expected rate of change to the actual rate of change.

8. The method according to claim 1, further comprising:
the controller receiving the temperature within the transport unit;
the controller comparing the temperature within the transport unit to the preset setpoint temperature;
the controller determining that the temperature within the transport unit is equal to the preset setpoint temperature; and
the controller controlling the compressor to operate at the lowest permissible speed in the continuously variable speed mode.

9. A method for electronically controlling a transport refrigeration system that provides climate control within a transport unit, the transport refrigeration system including a refrigerant fluid circuit that includes a valve and a compressor configured to compress refrigerant flowing through the refrigerant fluid circuit, the valve configured to control refrigerant flow through the refrigerant fluid circuit, the method comprising:
a controller device receiving temperature data from a sensor device; and
the controller determining that a temperature within the transport unit has reached a preset setpoint temperature based on the temperature data;
upon determining that the temperature within the transport unit has reached the preset setpoint temperature, the controller determining that the temperature within the transport unit is drifting away from the preset setpoint temperature in an opposite direction as a temperature control mode;
the controller instructing the valve to open and increasing the compressor speed while the valve is open in order to stop the temperature within the transport unit from drifting further away from the preset setpoint temperature.

10. The method according to claim 9, further comprising the controller operating the compressor to have a variable speed mode which allows the compressor to run continuously with a gradient range of speed variations to have a variable refrigeration capacity.

11. The method according to claim 10, wherein the variable speed mode includes a continuously-variable speed mode.

12. The method according to claim 9, further comprising the controller operating the compressor in one or more of a start-stop operation stage, a cycle-sentry operation stage, and a continuous run operation stage.

13. The method according to claim 9, further comprising prior to determining that the temperature within the transport unit has reached the preset setpoint temperature:
the controller determining a target compressor speed to be reached based on the temperature data;
the controller controlling the compressor to achieve the target compressor speed.

14. The method according to claim 9, further comprising:
the controller determining an expected rate of change to a temperature within the transport unit with respect to time;
the controller determining an actual rate of change to the temperature within the transport unit with respect to time based on temperature data;
the controller performing a comparison of the expected rate of change to the actual rate of change; and
the controller controlling the compressor speed based on the comparison of the expected rate of change to the actual rate of change.

15. The method according to claim 9, further comprising:
the controller receiving the temperature within the transport unit;
the controller comparing the temperature within the transport unit to the preset setpoint temperature;
the controller determining that the temperature within the transport unit is equal to the preset setpoint temperature; and
the controller controlling the compressor to operate at the lowest permissible speed in the continuously variable speed mode.

16. A transport refrigeration system comprising:
a refrigerant fluid circuit that includes a valve, wherein the valve is configured to control refrigerant flow through the refrigerant fluid circuit;
a compressor configured to compress refrigerant flowing through the refrigerant fluid circuit;
a controller configured to:
receive a temperature inside a transport unit, and then compare the temperature inside the transport unit to a preset setpoint temperature, and
control the compressor and the valve to reach the preset setpoint temperature inside the transport unit,
wherein, after the controller device determines that the temperature inside the transport unit has reached the preset setpoint temperature, the controller device is configured to determine whether the temperature inside the transport unit is drifting away from the preset setpoint temperature in a same direction as the operational mode or in an opposite direction as the operational mode, and then operate one or more of the compressor and the valve to modulate a variable refrigeration capacity,
wherein upon the controller device determining that the temperature inside the transport unit is drifting away from the preset setpoint temperature in the same direction as the operational mode, the controller reduces a compressor speed so as to operate at a lowest permissible compressor speed and instructs the valve to close while the compressor is operating at the lowest permissible compressor speed in order to stop the temperature inside the transport unit from drifting further away from the preset setpoint temperature, and
wherein upon the controller device determining that the temperature inside the transport unit is drifting away from the preset setpoint temperature in the opposite direction as the operational mode, the controller instructs the valve to open in order to stop the temperature inside the transport unit from drifting further away from the preset setpoint temperature and increases a compressor speed while the valve is open.

17. The transport refrigeration system of claim 16, wherein the controller is configured to operate the compressor to have a variable speed mode which allows the compressor to run continuously with a gradient range of speed variations to have a variable refrigeration capacity, and
wherein the variable speed mode includes a continuously-variable speed mode.

18. The transport refrigeration system according to claim 16, wherein the controller is configured to operate the compressor in one or more of a start-stop operation stage, a cycle-sentry operation stage, and a continuous run operation stage.

* * * * *